(12) United States Patent
Sandrock-Grabsky

(10) Patent No.: US 7,711,912 B2
(45) Date of Patent: May 4, 2010

(54) SYSTEM AND METHOD FOR DATA BACKUP AND RECOVERY

(75) Inventor: John B. Sandrock-Grabsky, Naperville, IL (US)

(73) Assignee: Computer Associates Think, Inc., Islandia, NY (US)

( * ) Notice: Subject to any disclaimer, the term of this patent is extended or adjusted under 35 U.S.C. 154(b) by 471 days.

(21) Appl. No.: 11/681,580

(22) Filed: Mar. 2, 2007

(65) Prior Publication Data

US 2007/0220214 A1    Sep. 20, 2007

Related U.S. Application Data

(60) Provisional application No. 60/779,000, filed on Mar. 3, 2006.

(51) Int. Cl.
*G06F 12/00* (2006.01)
(52) U.S. Cl. ...................................... 711/162
(58) Field of Classification Search ................ 711/162, 711/161, 165, 167, 169
See application file for complete search history.

(56) References Cited

U.S. PATENT DOCUMENTS

2003/0126247 A1    7/2003    Strasser et al. .............. 709/223

FOREIGN PATENT DOCUMENTS

GB    2 411 493 A    8/2005

WO    WO 2005/114420 A2    12/2005

OTHER PUBLICATIONS

Invitation to Pay Additional Fees; International Application No. PCT/US2007/005553; International Filing Date: Mar. 2, 2007, Mailed Aug. 30, 2007.

*Primary Examiner*—Pierre-Michel Bataille
(74) *Attorney, Agent, or Firm*—Baker Botts L.L.P.

(57) ABSTRACT

Methods and systems are disclosed for creating and recovering backup copies of computer data in an enterprise. An example method is disclosed for recovering computer data from a plurality sequential access devices. The method includes identifying a plurality of objects to be recovered, identifying a backup corresponding to each identified object to be recovered, and identifying a volume or multi-volume set corresponding to each backup, each backup being stored on the corresponding volume or set of volumes. The method also includes determining a number of sequential access media devices available for use. In accordance with the example method, the plurality of objects may be sorted according to the size of the volume or set of volumes corresponding to each of the identified objects. The method further includes recovering the objects in the order in which they were sorted. Recovering the objects includes directing the sequential access devices to concurrently recover the identified objects in the order in which sorted. Other methods, apparatus, systems and computer readable media are disclosed for backup and recovery of computer data.

20 Claims, 10 Drawing Sheets

SYSTEM AND METHOD FOR DATA BACKUP AND RECOVERY

RELATED APPLICATIONS

The present application claims priority to U.S. Patent Application Ser. No. 60/779,000, filed on Mar. 3, 2006, the entirety of which is incorporated by reference into the present application.

TECHNICAL FIELD

The described systems and methods are generally related to information processing environments utilizing multiple sequential access devices to backup and/or recover data. More specifically, the described systems and methods are related to processing of backup volumes to reduce backup and recovery time.

BACKGROUND

Enterprises often employ large, complex, computing environments which include a number of servers and clients containing computer data. Certain systems and methods presently exist for backing up computer data that can be subsequently recovered. Such systems and methods may be used to backup computer data from and recover computer data to individual computers. Such systems and methods may also be used to backup computer data from and recover computer data to a plurality of computers, such as servers or clients, for example, connected to one or more networks. Typically, personnel such as system administrators or database administrators, for example, are responsible for implementing backup procedures which may involve scheduling backups and recovering selected portions of previously stored backup data to a particular computer when desired. Backup procedures are implemented to reduce or prevent any loss of data from the servers, clients or other computers that are subject to the backup procedures.

In some environments, sequential access devices are employed to backup computer data. Such sequential access devices may be selected and employed for a number of reasons, including the lower acquisition cost of such devices relative to comparable random access devices, lower maintenance costs of certain sequential access devices, and higher reliability of certain sequential access devices, for example.

Known backup storage systems and methods have certain disadvantages associated with creating sequential backup volumes and recovering computer data from a previously created sequential backup volume. One such disadvantage is that prior art backup and/or recovery systems and methods cause sequential backup volumes to be created and/or recovered without sufficient regard to efficient utilization of resources, such as efficient utilization of available sequential access devices, for example. Overcoming this disadvantage may be relevant in enterprise information processing environments which rely on high data availability where hours or even minutes of downtime are important. Overcoming this disadvantage may also be relevant in enterprise information processing environments in which it is desirable to reduce the amount of time sequential access devices are utilized for backup and recovery activities.

In some environments, responsible personnel may attempt to informally improve the efficiency of backup and recovery operations by selectively scheduling certain objects according to past experiences or rules of thumb. In other computing environments, however, such as those employing dynamic schema databases, for example, it is not possible for responsible personnel to plan optimal backup and recovery operations.

Consequently, there is a need for methods and systems that address the shortcomings of prior art backup and recovery applications and provide a more efficient backup and/or recovery of computer data to and/or from sequential backup volumes.

SUMMARY

The teachings of the present invention are related to database management tools and more specifically, to database backup and recovery tools where backup and/or recovery time is a competitive differentiator. The following presents a summary of methods, apparatus, systems, and computer readable media associated with backing up and/or recovering computer data to or from sequential access media in accordance with the present application.

In accordance with a particular embodiment of the present application, a method for transferring data to a plurality of devices includes identifying a plurality of discrete units of data to be transferred. A plurality of devices to receive the discrete units of data are also identified. An order for copying the discrete units of data according to an estimated or actual size of the discrete units is determined. The discrete units are transferred to the devices according to the order.

In accordance with another aspect of the present application, a method is disclosed for recovering computer data from a plurality of sequential access devices. The method includes identifying a plurality of objects to be recovered, identifying a backup corresponding to each identified object to be recovered, and identifying a volume or multi-volume set corresponding to each backup, each backup being stored on such corresponding volume or set of volumes. The method also includes determining a number of sequential access media devices available for use. In accordance with the example method, the plurality of objects are sorted according to the size of the volume or set of volumes corresponding to each of the identified objects. The method further includes recovering the objects in the order in which they were sorted. Recovering the objects includes directing the sequential access devices to concurrently recover the identified objects in the order in which sorted.

In accordance with a yet another aspect of the present application, a system is disclosed for recovering computer data. The system includes a computer and a plurality of sequential access devices controlled by the computer. The computer is operative to identify a plurality of objects to be recovered, a backup corresponding to each object to be recovered, and a volume or multi-volume set corresponding to each backup, each backup being stored on the corresponding volume or multi-volume set. The computer is also operative to determine a number of sequential access devices available for use in the recovery operation. The computer is further operative to sort the identified objects according to the size of the volume or multi-volume set corresponding to the identified objects. The plurality of sequential access devices in communication with the computer are operative to concurrently recover the objects in the sorted order In accordance with still another aspect of the present application, an apparatus is disclosed for recovering computer data from a plurality of sequential access devices. The apparatus includes a processor and a memory in communication with the processor. The memory stores a program to control the operation of the processor. The processor is operative with the program in the memory to identify a plurality of objects to be recovered, identify a backup corresponding to each identified object, and identify a volume or multi-volume set corresponding to each backup, each backup being stored on the corresponding a volume or set of volumes.

The processor may also be operative with the program in the memory to determine a number of sequential access devices available for use, and sort the identified objects according to the size of the corresponding volume or set of volumes. The processor is further operative with the program in the memory to recover the objects. The recovery activity includes directing the sequential access devices to concurrently recover the identified objects in the sorted order.

In accordance yet another aspect of the present application, a computer-readable storage medium is disclosed for implementing a method for recovering computer data from a plurality of sequential access devices. The computer-readable storage medium may be encoded with processing instructions. The processing instructions direct a computer to identify a plurality of objects to be recovered, identify a backup corresponding to each identified object, and identify at least one volume corresponding to each backup, each backup being stored on the corresponding a volume or set of volumes.

The processing instructions also direct a computer to determine a number of sequential access devices available for use, and sort the identified objects according to the size of the volume or set of volumes corresponding to each object. The processing instructions further direct a computer to recover the identified objects. The recovery activity includes directing the sequential access media devices to concurrently recover the identified objects in the sorted order.

Certain illustrative aspects of the methods and systems are described herein in connection with the following description and the annexed drawings. These aspects are indicative, however, of but a few of the various ways in which the principles of the methods, apparatus, systems, and media may be employed and thus the examples are intended to include such aspects and equivalents. Other advantages and novel features may become apparent from the following detailed description when considered in conjunction with the drawings.

BRIEF DESCRIPTION OF THE DRAWINGS

For a more complete understanding of the present methods and systems, reference is now made to the following description taken in conjunction with the accompanying drawings in which like reference numbers indicate like features and wherein.

DETAILED DESCRIPTION

Figure 1:
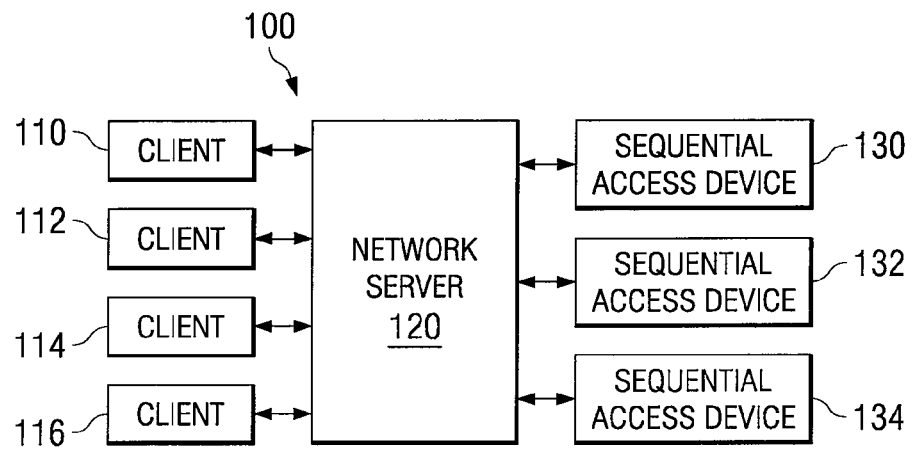
FIG. 1 is a block diagram illustrating an example enterprise information processing environment, in accordance with the systems and methods described in the present application.

Example methods and systems are now described with reference to the drawings, where like reference numerals are used to refer to like elements throughout. In the following description, for purposes of explanation, numerous specific details are set forth in order to facilitate thoroughly understanding the methods and systems. It may be evident, however, that the methods and systems can be practiced without these specific details.

Referring to FIG. 1, a schematic block diagram illustrates an example enterprise information processing environment 100, and associated data flow within the example environment. The example enterprise environment 100 includes a plurality of client computers 110-116 that are in communication with a network server 120. Network server 120 is also in communication with sequential access devices 130, 132 and 134. The illustrated sequential access devices 130, 132 and 134 are not limited to any particular type of sequential access device, and may be any type of device that provides access to sequentially stored data, such as a tape drive, for example. In accordance with another embodiment of the present invention, sequential access devices may include tape silos. For example, the tape silos may comprise a tape drive having a robotic arm that transfers tapes between the drive and the storage device. It is to be understood that these are merely example environments provided for illustrative purposes, and that other enterprise environments consistent with the present application may have more, fewer and/or different components than those illustrated in FIG. 1.

In this example environment 100, computer data from the client computers 110-116 and/or the network server 120 may be transferred to and/or from sequential storage media via sequential access devices 130, 132 and 134. The software for directing the transfer of computer data to and/or from the sequential storage media, generally referred to herein as backup/recover software, may reside at a client computer, such as client 110, or at a server, such as network server 120, or may be distributed among several components of the enterprise environment 100.

The computer data transferred to/from the sequential access storage media is organized into discrete items. Examples of computer data include files or objects that can be selected and maneuvered, such as an onscreen graphic. In object-oriented programming, objects include data and procedures which operate on that data. When computer data is archived or transferred to sequential access storage media, a backup is created. A backup is a copy of the computer data, such as program or file, for example, that is stored separately from the original. A backup may be stored on a volume, which is the storage space on sequentially accessed storage media, such as a DASD, tape, or optical devices, for example. Logically related volumes may be grouped into a multi-volume set.

Figure 2:
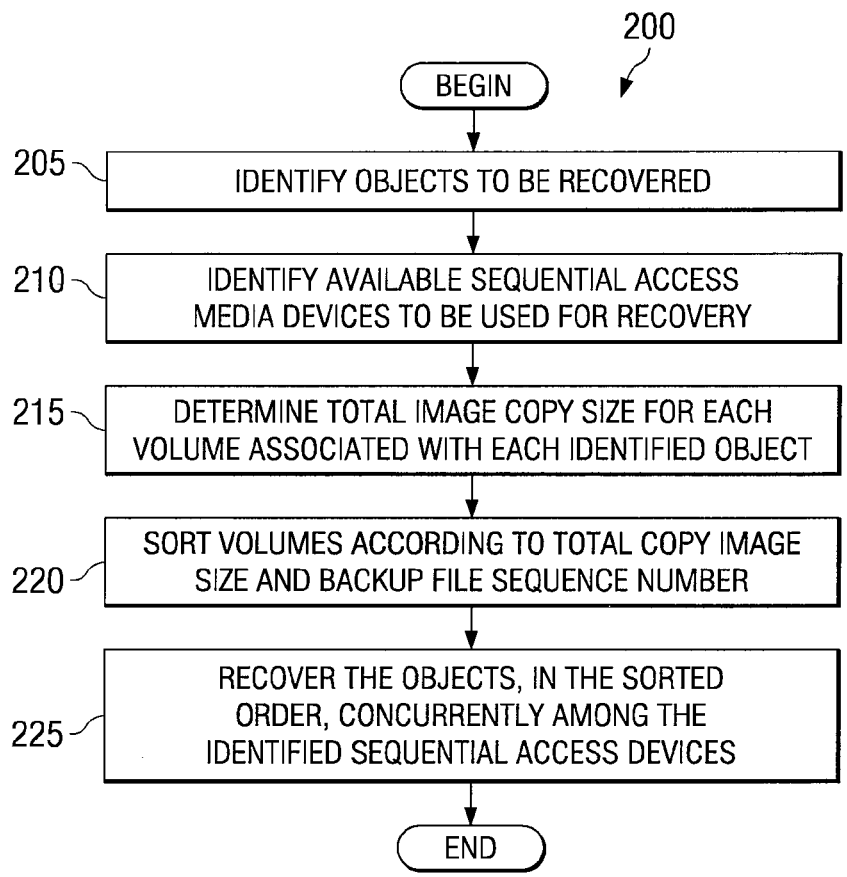
FIG. 2 is a flow chart illustrating an example methodology for recovering a plurality of objects using a plurality of sequential access devices.

FIG. 2 is a flowchart illustrating an example method 200 for recovering computer data stored on a sequential access device, such as device 130. For purposes of clarity and simplicity, the present application discusses recovery operations, but it should be understood that the discussed concepts apply equally well and may be applied to backup operations, as well. In general, one of the primary limiting factors to sequential access devices is the movement of media through the device. Thus, both writing (backup) and reading (recovery) operations may benefit from the teachings of the present invention.

At block 205, a plurality of objects to be recovered are identified. The selection of the objects to be recovered may be accomplished, for example, manually by a user via a graphical user interface ("GUI"), automatically by an application program, or in any other way known to those of ordinary skill in the art.

At block 210, a plurality of sequential access devices, such as devices 130, 132 and 134, for example, are identified as available to be used to recover the objects identified at block 205. As shown at block 215, the total image copy size is determined for each volume associated with each identified object. The volumes are then sorted according to total copy image size and backup file sequence number, at block 220. One example methodology for sorting the volumes is described in more detail with reference to FIG. 3.

Of course, there may be other ways to sort the objects or volumes to efficiently utilize the available sequential access devices. One such alternate way to sort the volumes would be to sort the volumes according to a logged recovery time determined when a backup is created. Essentially, the objects may be sorted in any order that approximates the amount of time it will take to recover objects from the volume or set of volumes.

At block 225, the recovery of the identified objects is distributed among all of the sequential access devices identified at block 210. The volumes associated with the identified objects are assigned to the sequential access devices sort order determined at block 220. In one example embodiment, described more fully with reference to FIG. 4, a script is created to directing the recovery of the identified objects using the available sequential access devices. Regardless of the specific embodiment, each volume or multi-volume set is effectively assigned to the first available sequential access device which recovers all of the identified objects associated with that volume or multi-volume set. In accordance with a particular embodiment of the present invention, the method assigns sequential access devices as they become available.

In accordance with one embodiment of the present invention, different transfer rates or speeds of the sequential access devices are not factored in. However, a faster device will more often become available for the next queued backup/recover task, which are sorted in accordance with one embodiment of the invention from most to least processing time required. By this process faster machines will tend to get more work. Thus, this invention may affect an inherent balance of distributed processing and queued units of work.

The methodology of FIG. 2 provides significant advantages over the prior art backup/recover solutions. One advantage is that instead of merely employing multiple sequential access devices to decrease the total transfer time of a particular backup/recover operation, the described methodology intelligently sorts and distributes the backup and/or recovery work to multiple sequential access devices according to the amount of time for which each volume is expected to utilize a sequential access device. Accordingly, the backup and/or recovery work is distributed two or more devices starting with the most time consuming volumes first.

Figure 3:
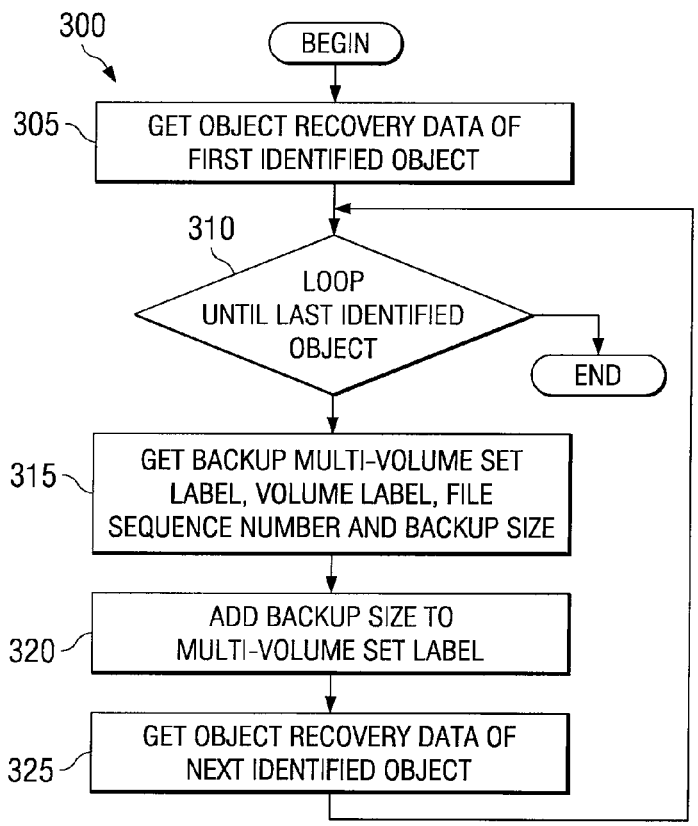
FIG. 3 is a flow chart illustrating an example methodology for sorting object recovery data.

FIG. 3 is a flowchart illustrating an example embodiment 300 for sorting volumes according to total copy image size and backup file sequence number, as represented by block 220 of FIG. 2. At block 305, object recovery data is accessed for a first object of the plurality of objects to be recovered. At block 310, it is determined whether the list of identified objects has been processed. If the list of identified objects has been fully processed, the sorting methodology is completed. If the list of identified objects has not been fully processed, control is directed to block 315. At block 315, the following data is retrieved: the backup multi-volume set label, the volume label, the file sequence number and the backup size. The backup size is added to the multi-volume set label at block 320. The modified multi-volume set label is the index according to which the objects are recovered. Accordingly, the objects are recovered in descending order of the backup size as indicated by the multi-volume set labels. At block 325, the object recovery data for the next identified object is retrieved, and control passes to block 310.

Figure 4:
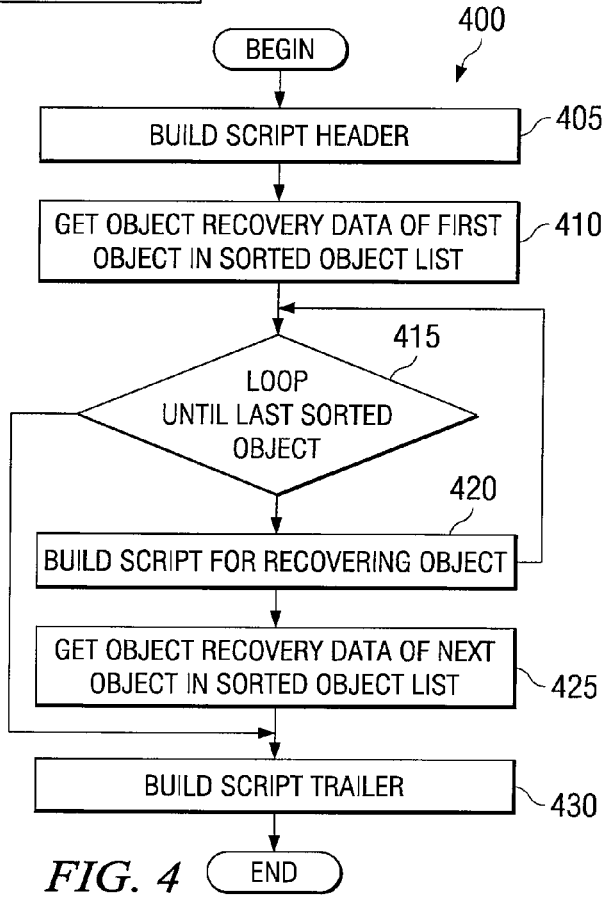
FIG. 4 is a flow chart illustrating an example methodology for building an object recovery script.

FIG. 4 is a flowchart illustrating an example embodiment 400 for recovering the objects, in the sorted order, concurrently among the identified sequential access devices, as represented by block 225 of FIG. 2. According to the example embodiment, a script is created to control and direct the recovery of the identified objects. At block 405, a script header is built. In accordance with a particular embodiment of the present invention, Build Script Header (e.g., 405) and Build Script Trailer (e.g., 430) create the syntax to tell the operating system what function(s) is occurring (e.g., backup or recovery) and which resources (e.g., devices, files and/or objects) are needed to complete the function.

The script header initializes the values employed by the script. At block 410, object recovery data is accessed for the first object of the sorted list of objects to be recovered. At block 415, it is determined whether the list of identified objects has been processed. If the list of identified objects has been fully processed, control is directed to block 430. Otherwise, control is directed to block 420 which builds the portion of the script responsible for recovering the object. The script directs the first available identified sequential access device to recover the object. In accordance with a particular embodiment of the present invention, the first available sequential access device will recover all objects from the current volume.

At block 425, the object recovery data for the next identified object in the sorted list is retrieved, and control is directed to block 415. Block 430 is processed after script portions have been built for all of the identified objects. At block 430, a script trailer is built. As stated previously, the script trailer and the script header create the syntax to communicate with the operating system.

The methods and systems described herein result in a more efficient recovery of computer data than prior art solutions. Specifically, prior art solutions enable recovery of objects from a single sequential access device, or recovery of objects from multiple sequential access devices without regard to the efficient use of such devices.

Prior art backup solutions typically transfer objects in the order in which they appear in a directory. Prior art recovery solutions typically sort image copies by file sequence number within a given backup volume. This insures that once a volume is started processing, all image copies on that volume that are needed are used before switching to another volume. The prior art has recognized that switching image copy volumes is time-consuming and thus inefficient.

Figure 5A:
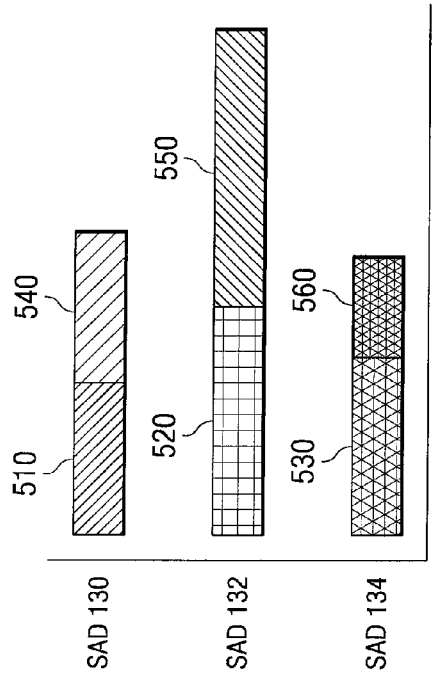
FIGS. 5A-5C are bar graphs illustrating comparative amounts of time required to recover a plurality of example objects using various recovery techniques.
Figure 5B:
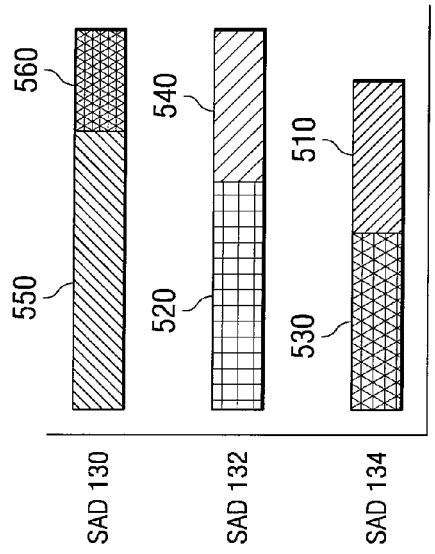
Figure 5C:
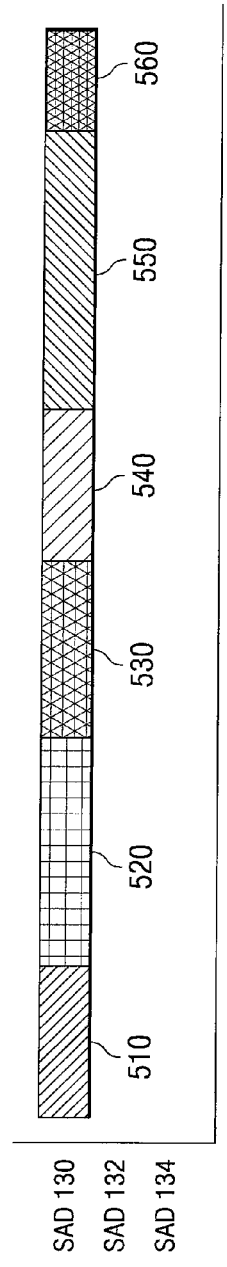

Referring now to FIGS. 5A-5C, FIG. 5A is a bar chart illustrating the amount of time required to recover objects from volumes 510, 520, 530, 540, 550 and 560 using a single sequential access device 130.

FIG. 5B is a bar chart illustrating the amount of time required to recover objects from volumes 510, 520, 530, 540, 550 and 560, in the order in which the volumes were created, using three available single sequential access devices 130, 132 and 134.

FIG. 5C is a bar chart illustrating the amount of time required to recover objects from volumes 510, 520, 530, 540, 550 and 560, in accordance with the methods and systems of the present application, using three available single sequential access devices 130, 132 and 134. It should be noted that the use of additional sequential access devices enables the total recovery time illustrated in FIG. 5B to be less than the total recovery time illustrated in FIG. 5A. The total recovery time employing the methods and systems of the present application, however, illustrated in FIG. 5C, is even less than that illustrated in FIG. 5B, even though the same three devices, 130, 132 and 134, are employed.

Figure 6:
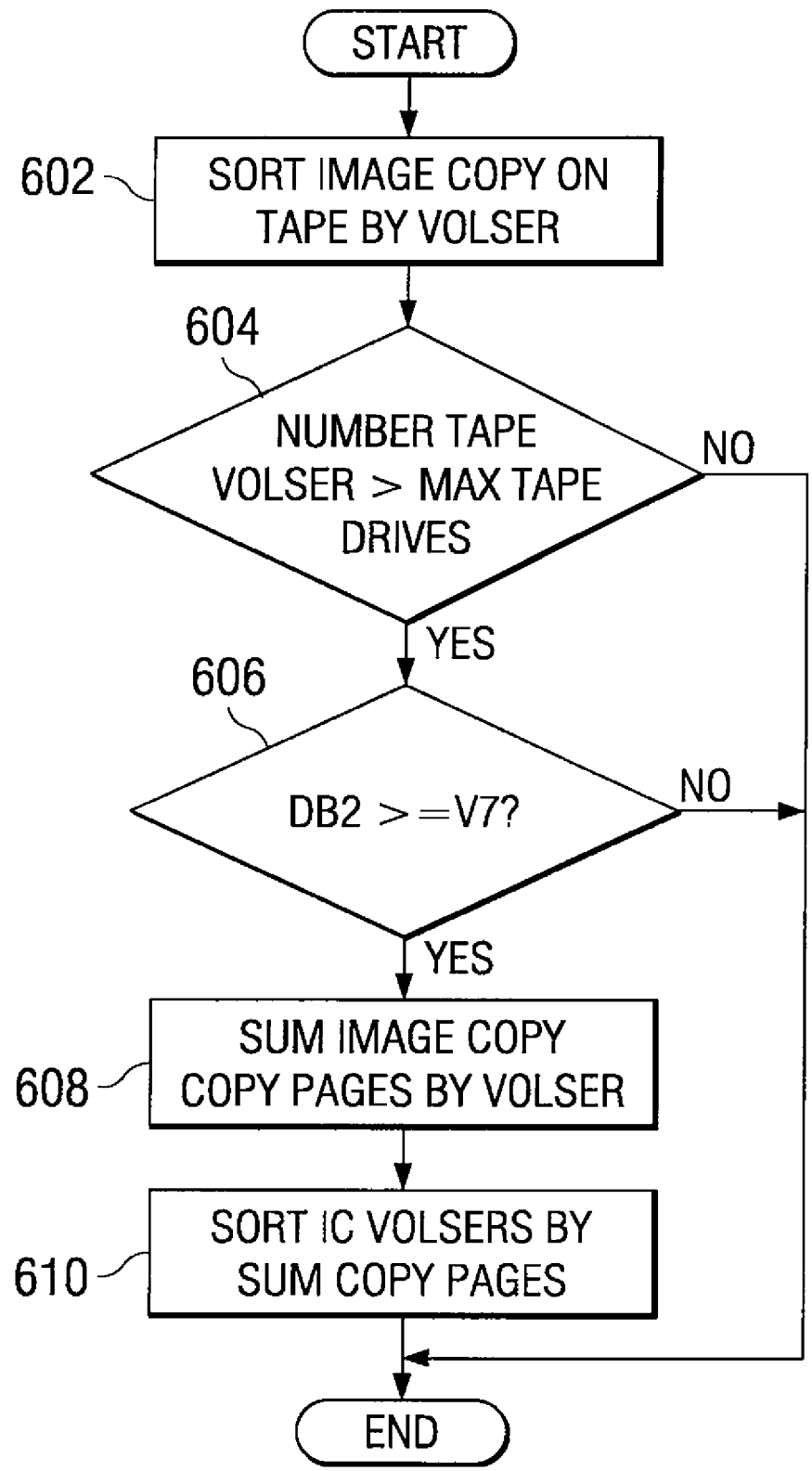
FIG. 6 illustrates a method for recovering objects on tape, in accordance with a particular embodiment of the present invention.

FIG. 6 illustrates a flowchart that may be used to incorporate the teachings of the present invention into a method for improving the recovery of objects on tape, in accordance with a particular embodiment of the present invention. Method 600 of FIG. 6 begins at step 602, where image copies on tape are sorted by volume and serial number ("volser"). In this embodiment, the volume is sorted first because the volume groups objects that are stored on tape together. At step 604, a determination is made regarding whether the number of tape volsers is greater than the maximum number of tape drives to be used. If yes, the method proceeds to step 606, where it is determined whether a version greater than or equal to version 7 of DB2 is being used. This is pertinent to particular aspects of the present invention, because DB2 version 7 and higher provide additional information regarding the estimated size of the object or file, that can be used advantageously in accordance with the teachings of the present invention. If it is, than the method proceeds to step 608, where the image copy copy pages are summed by volser. Next, at step 610, the image copies volsers are sorted by sum copy pages.

Figure 7A:
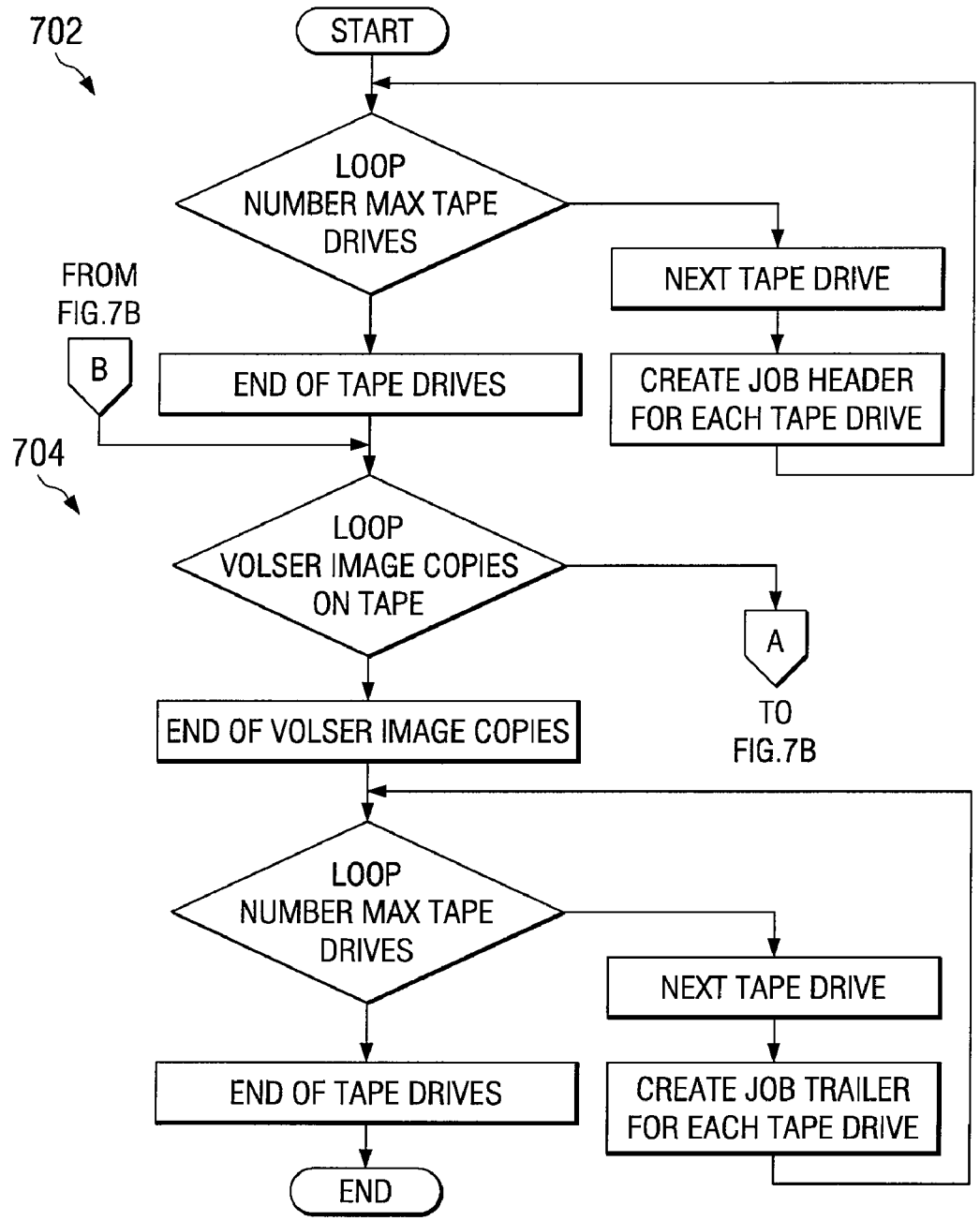
FIG. 7 illustrates a method to generate recovery objects on tape jobs, in accordance with a particular embodiment of the present disclosure.
Figure 7B:
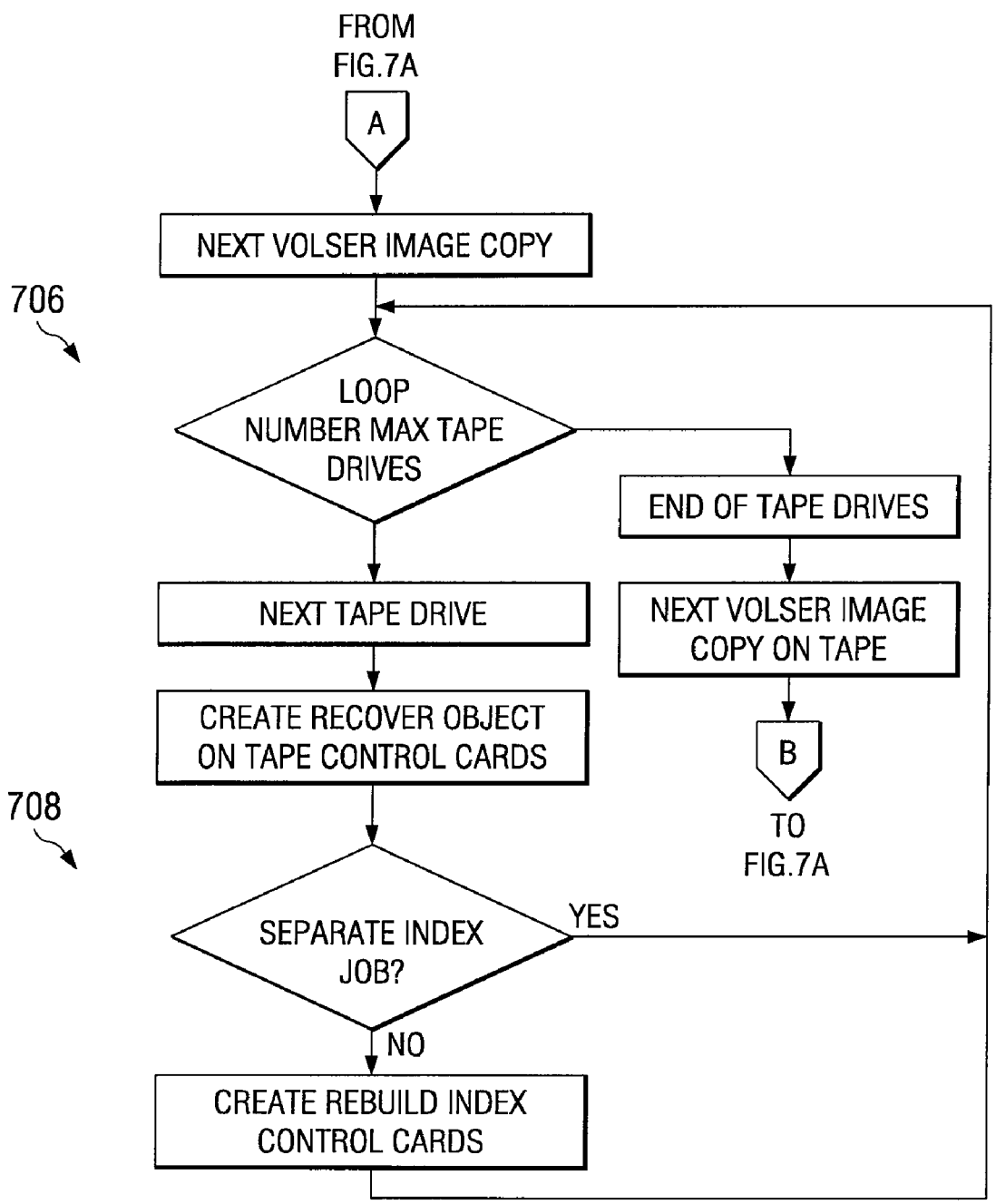

FIG. 7 illustrates a method to generate recovery objects on tape jobs, in accordance with a particular embodiment of the present disclosure. The method includes a loop 702, in which a job header is created for each tape drive. The header may include information regarding security credentials and describing the job to be done. A second loop 704 loops through each volser on tape, and a third loop 706 loops through the tape drives and creates recover object on tape control cards. A fourth loop 708 creates rebuild index control cards. Finally, at loop 710, job trailers are created for each tape drive.

Figure 8A:
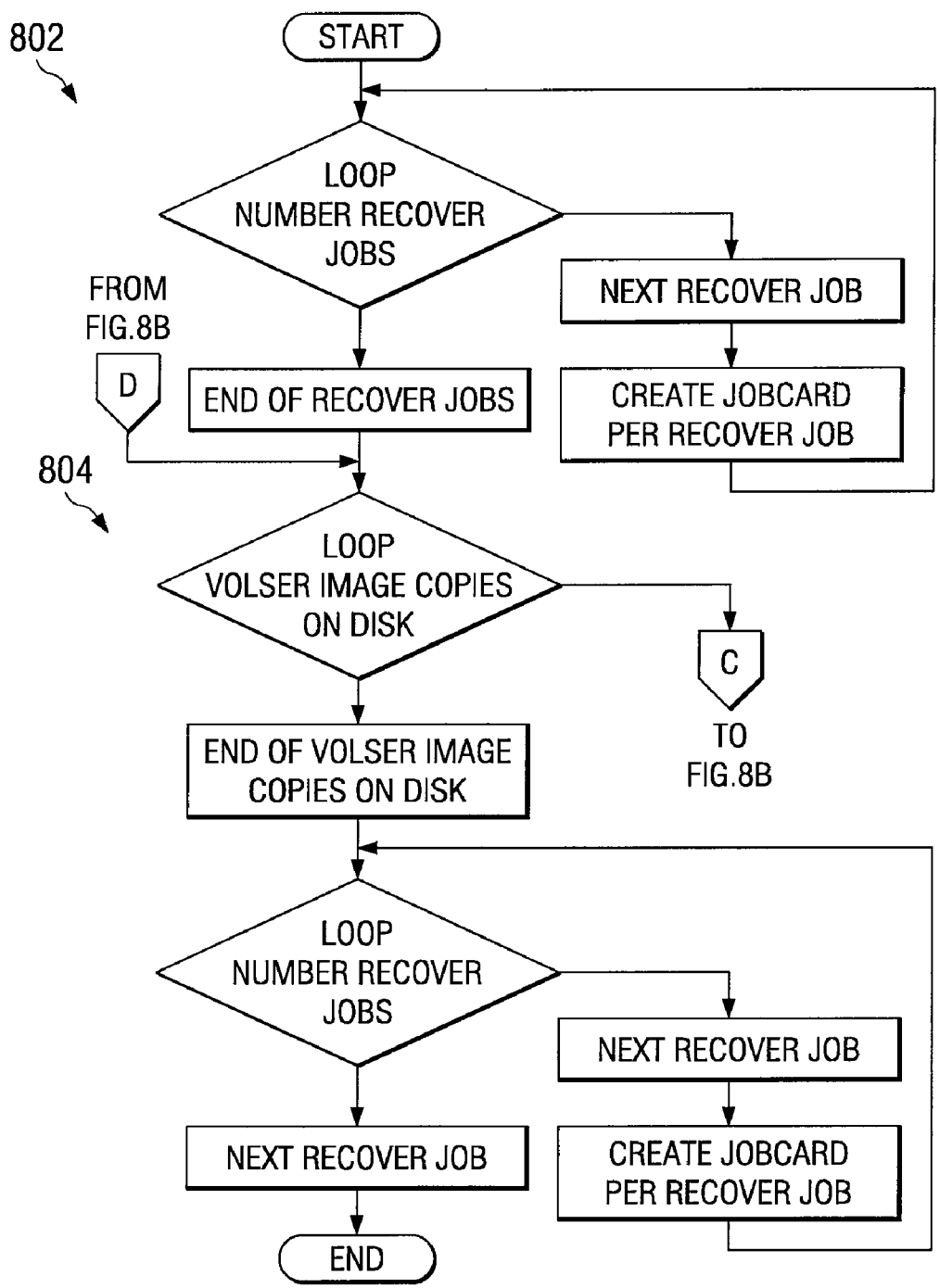
FIG. 8 illustrates a method to generate recovery objects on disk jobs, in accordance with another embodiment of the present disclosure.
Figure 8B:
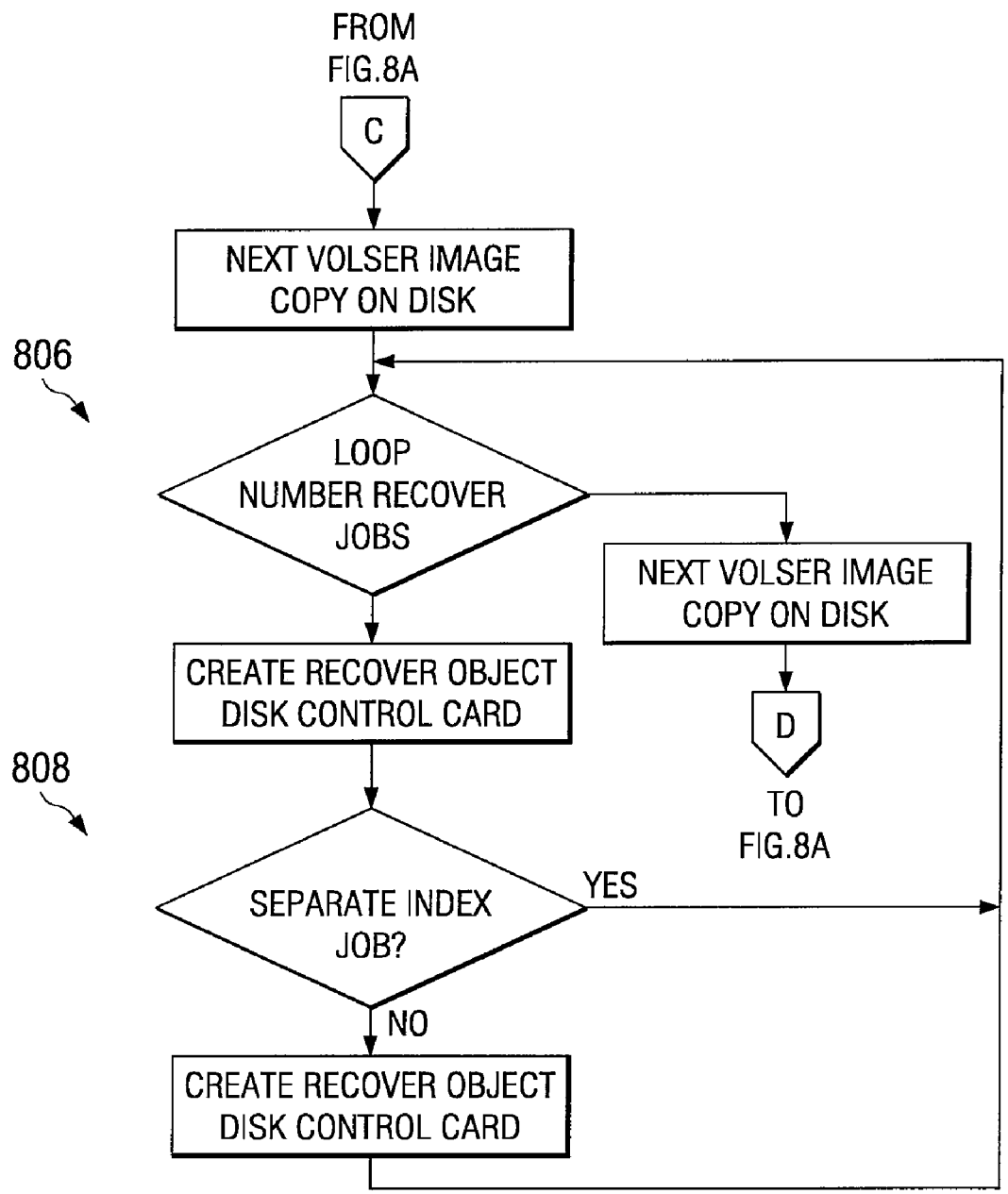

FIG. 8 illustrates a method to generate recovery objects on disk jobs, in accordance with another embodiment of the present disclosure. FIG. 8 is similar to FIG. 7. The method includes a loop 802, in which a jobcard is created for each recover job. A second loop 804 loops through each volser on disk, and a third loop 806 loops through the recover jobs and creates recover object disk control cards. A fourth loop 808 creates recover object disk control cards. Finally, at loop 810, jobcards are created for each recover job.

In accordance with another embodiment of the present invention, the techniques described herein with respect to performing backup and/or restore operations of a plurality of sequential access devices may be adapted to improve computing in a grid computing environment. For example, consider a collection of self-contained processing work tasks that may be executed in any arbitrary order running on a grid of central processing unit (CPU) hardware. The techniques of the present invention could be adapted to determine an optimal ordering and assignment of those tasks to the processors of the grid of CPU hardware.

One such embodiment may include a plurality of CPUs that are used to rebuild a plurality of indexes. Utilities that rebuild such indexes typically use multiple CPUs to accomplish the task. The assignment of multiple indexes to multiple CPUs may be accomplished according to the teachings of the present invention. For example, the rebuild jobs may be ordered according to the largest estimated processor time required to the smalles estimated processor time required. Then, the rebuild jobs may be assigned to the CPUs, in the order, in a round-robin manner.

Figure 9A:
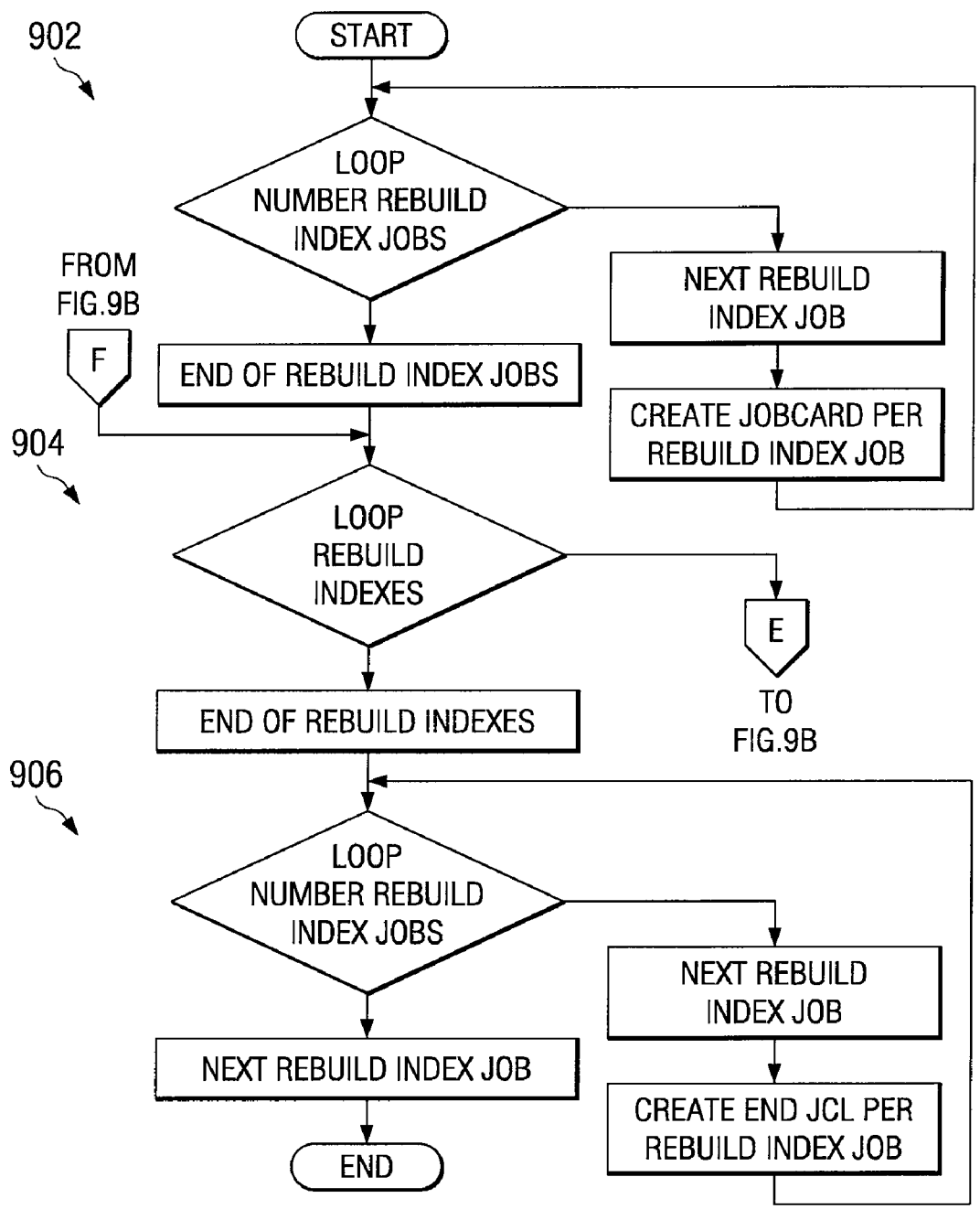
FIG. 9 illustrates a method to generate rebuild index jobs, in accordance with a particular embodiment of the present invention.
Figure 9B:
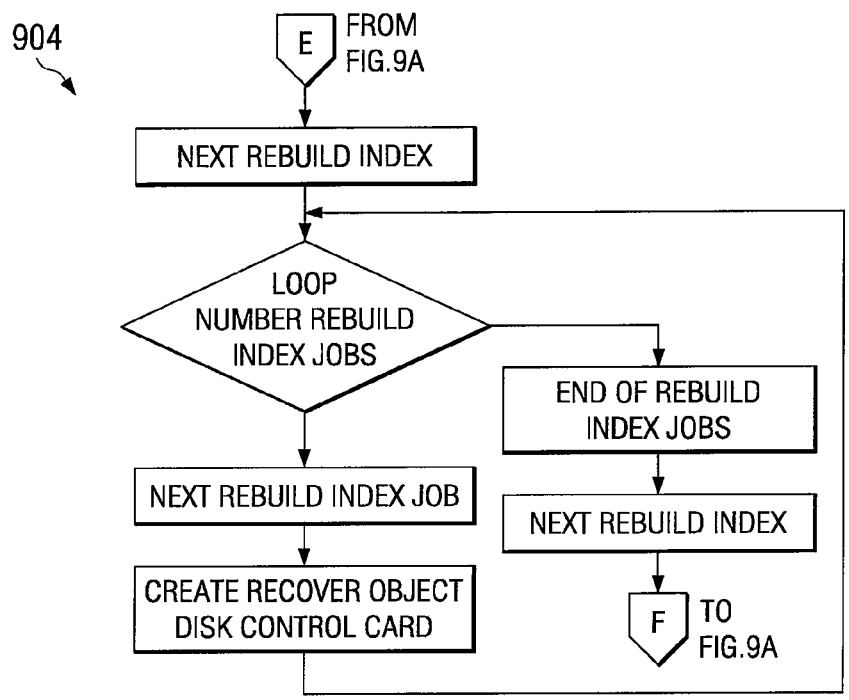

FIG. 9 illustrates a method to generate rebuild index jobs, in accordance with a particular embodiment of the present invention. This method may be used for example, regarding ERP point in time recovery. In such an environment, there is a relationship between data in tables and pointers in indexes that must be maintained. The method of FIG. 9 describes how to maintain the table-index relationship, within the teachings of the present disclosure.

A loop 902 is used to create jobcard for each rebuild index job. Next, a loop 904 is used to rebuild indexes for each rebuild index job, and includes creating a recover object disk control card for each. Finally, loop 906 creates end JCL for each rebuild index job, until complete.

Figure 10:
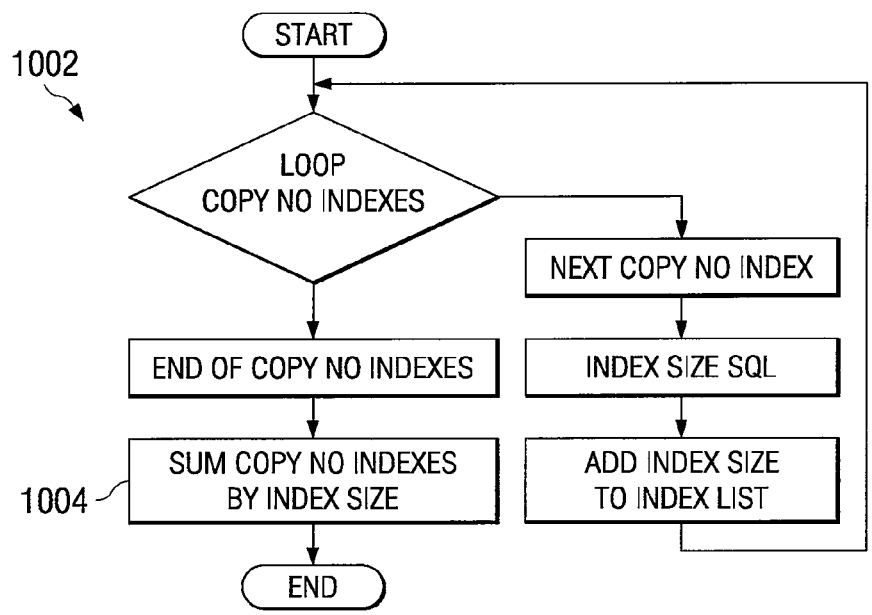
FIG. 10 illustrates a method to optimize rebuild index objects, in accordance with an alternative embodiment of the teachings of the present disclosure.

FIG. 10 illustrates a method to optimize rebuild index objects, in accordance with an alternative embodiment of the teachings of the present disclosure. A loop 1002 establishes index size SQL for each copy number index, and adds the index size to the index list. At step 1004, the copy number indexes are summed by index size. It should be noted that some indexes can be recovered rather than rebuild. The recovered indexes are also included in the list of objects to be restored from a backup.

What has been described above and includes several examples. It is, of course, not possible to describe every conceivable combination of components or methodologies for purposes of describing the systems, apparatus, methods, and computer readable media associated with backup and recovery of computer data within an enterprise. However, one of ordinary skill in the art may recognize that further combinations and permutations are possible. Accordingly, this application is intended to embrace such alterations, modifications, and variations that fall within the scope of the appended claims.

What is claimed is:

1. A method for transferring data to a plurality of devices, comprising:
    identifying a plurality of discrete units of data to be transferred, wherein each discrete unit of data comprises at least one unsplit file, and wherein if a particular discrete unit of data comprises more than one file, then each of the files is unsplit;
    identifying a plurality of devices to receive the discrete units of data;
    determining an order for copying the discrete units of data according to an estimated or actual size of the discrete units; and
    transferring the discrete units to the devices according to the order.

2. The method of claim 1, wherein a number of discrete units of data to be transferred is greater than a number of the devices.

3. The method of claim 2, wherein the order is approximately largest to smallest estimated or actual size of the discrete units.

4. The method of claim 3, wherein the discrete units are transferred to the devices in a round robin manner.

5. The method of claim 1, wherein the discrete units comprise objects of data stored on a client that are to be backed up, and the devices to receive the discrete units comprise sequential access devices.

6. The method of claim 1, wherein the discrete units comprise files to be recovered from a plurality of sequential access devices and the plurality of devices comprise clients to receive recovered files.

7. A method for recovering computer data, comprising:
identifying a plurality of objects to be recovered;
identifying at least one volume corresponding to each identified object, each identified object being stored on the corresponding at least one volume;
determining a number of sequential access media devices available for use;
sorting the identified objects according to the size of the identified objects, the identified objects sorted by descending size, thereby defining a sorted order; and
recovering the identified objects, including directing the sequential access devices to concurrently recover the identified objects in the sorted order.

8. The method of claim 7, wherein identifying includes receiving a list of user-selected objects to be recovered.

9. The method of claim 7, wherein sorting includes:
creating a list of objects, the list including backup multi-volume set label, backup multi-volume set label size, volume label, file sequence identifier, and backup size;
updating the volume set label to reflect the backup size; and
sorting the list, in descending order, according to the updated volume set label.

10. The method of claim 7, wherein recovering includes:
building a header for a recovery script;
building a portion of the recovery script for each object in the sorted order;
building a trailer for the recovery script; and
invoking the recovery script.

11. The method of claim 7, wherein each identified object is retrieved by a single sequential access device; and
wherein directing the sequential access devices to concurrently recover the identified objects in the sorted order, includes directing a particular sequential access device to recover the next identified object in the sorted order that has not been retrieved by the sequential access devices when the particular sequential access device finishes retrieving a particular identified object.

12. A method for recovering computer data, comprising:
identifying a plurality of objects to be recovered;
identifying a backup corresponding to each identified object;
identifying at least one volume corresponding to each backup, each backup being stored on the corresponding at least one volume;
determining a number of sequential access media devices available for use;
sorting the identified objects according to a value approximating a recovery time, thereby defining a sorted order; and
recovering the identified objects, including directing the sequential access devices to concurrently recover the identified objects in the sorted order.

13. The method of claim 12, wherein the value approximating a recovery time is a size of the at least one volume corresponding to the backup corresponding to each of the identified objects.

14. The method of claim 13, wherein identifying includes receiving a list of user-selected objects to be recovered.

15. The method of claim 13, wherein sorting includes:
creating a list of objects, the list including backup multi-volume set label, backup multi-volume set label size, volume label, file sequence identifier, and backup size;
updating the volume set label to reflect the backup size; and
sorting the list, in descending order, according to the updated volume set label.

16. The method of claim 13, wherein recovering includes:
building a header for a recovery script;
building a portion of the recovery script for each object in the sorted order;
building a trailer for the recovery script; and
invoking the recovery script.

17. The method of claim 12, wherein the value approximating a recovery time is a logged recovery time associated with the at least one volume corresponding to the backup corresponding to each of the identified objects.

18. A system for recovering computer data, comprising:
a computer operative to identify:
a plurality of objects to be recovered,
at least one volume corresponding to each identified object, each identified object being stored on the corresponding at least one volume;
the computer being further operative to determine a number of sequential access devices available for use;
the computer being further operative to sort the identified objects according to the size of the identified objects, the identified objects sorted by descending size, thereby defining a sorted order; and
a plurality of sequential access devices in communication with to the computer, the plurality of sequential access media devices operative to concurrently recover the identified objects in the sorted order.

19. An apparatus for recovering computer data from a plurality of sequential access devices, comprising:
a processor;
a memory connected to said processor storing a program to control the operation of said processor;
the processor operative with the program in the memory to:
identify a plurality of objects to be recovered;
identify at least one volume corresponding to each identified object, each identified object being stored on the corresponding at least one volume;
determine a number of sequential access media devices available for use;
sort the identified object according to the size of the identified objects, the identified objects sorted by descending size, thereby defining a sorted order; and
recover the identified objects, including directing the sequential access devices to concurrently recover the identified objects in the sorted order.

20. A computer-readable storage medium encoded with processing instructions for implementing a method for recovering computer data from a plurality of sequential access devices, the processing instructions for directing a computer to perform the steps of:
identifying a plurality of objects to be recovered;
identifying at least one volume corresponding to each identified object , each identified object being stored on the corresponding at least one volume;
determining a number of sequential access media devices available for use;
sorting the identified objects according to the size of the identified objects, the identified objects sorted by descending size, thereby defining a sorted order; and
recovering the identified objects, including directing the sequential access devices to concurrently recover the identified objects in the sorted order.

* * * * *